United States Patent [19]
Chase

[11] 3,774,926
[45] Nov. 27, 1973

[54] SKI DEVICE FOR WHEELED VEHICLES

[76] Inventor: Raymond L. Chase, 16951 Round Lake Blvd., Anoka, Minn. 55303

[22] Filed: Nov. 17, 1971

[21] Appl. No.: 199,523

[52] U.S. Cl. .................................. 280/13, 280/28
[51] Int. Cl. ........................................... B62b 19/02
[58] Field of Search ..................... 280/13, 8, 28, 35, 280/79.1, 179 A

[56] References Cited
UNITED STATES PATENTS
| | | | |
|---|---|---|---|
| 3,321,211 | 5/1967 | Bryant | 280/13 |
| 1,392,438 | 10/1921 | Nelson | 280/13 |
| 2,539,997 | 1/1951 | Graves | 280/179 A |

Primary Examiner—Robert R. Song
Attorney—George F. Williamson et al.

[57] ABSTRACT

A ski device readily attachable to the conventional wheel of a wheeled vehicle equips the vehicle for travel over snow covered terrain. The ski device includes a ski having a wheel-receiving well thereon for receiving the wheel of a vehicle therein. An elongate flexible strap is secured to the ski and extends over the wheel to releasably secure the ski device to the vehicle wheel. A toggle linkage locking mechanism permits quick but positive attachment of a ski device to the wheel of a vehicle.

2 Claims, 3 Drawing Figures

PATENTED NOV 27 1973

3,774,926

INVENTOR.
Raymond L. Chase
BY Williamson, Bains
& Moore
ATTORNEYS

SKI DEVICE FOR WHEELED VEHICLES

SUMMARY OF THE INVENTION

Although there has been some development of skis which may be applied to the wheels of vehicles to equip the vehicle for travel over snow, these prior art devices are cumbersome and are difficult to apply to the vehicle wheel.

It is therefore an object of this invention to provide a ski device, of simple and inexpensive construction, which may be readily applied to and removed from the wheel of a vehicle to equip the vehicle for travel over a snow covered surface. The ski device includes a ski having an upwardly concave well structure mounted thereon, shaped and sized to receive the vehicle wheel therein. An elongate flexible strap provided with a toggle linkage means releasably secures the ski device to the vehicle wheel. The toggle linkage lock means permits ready quick removal of the device from application of the ski device to and from the vehicle wheel.

These and other objects and advantages of this invention will more fully appear from the following description made in connection with the accompanying drawings wherein like reference characters refer to the same or similar parts throughout the several views.

DETAILED DESCRIPTION OF THE INVENTION

Figures 1, 2, 3:
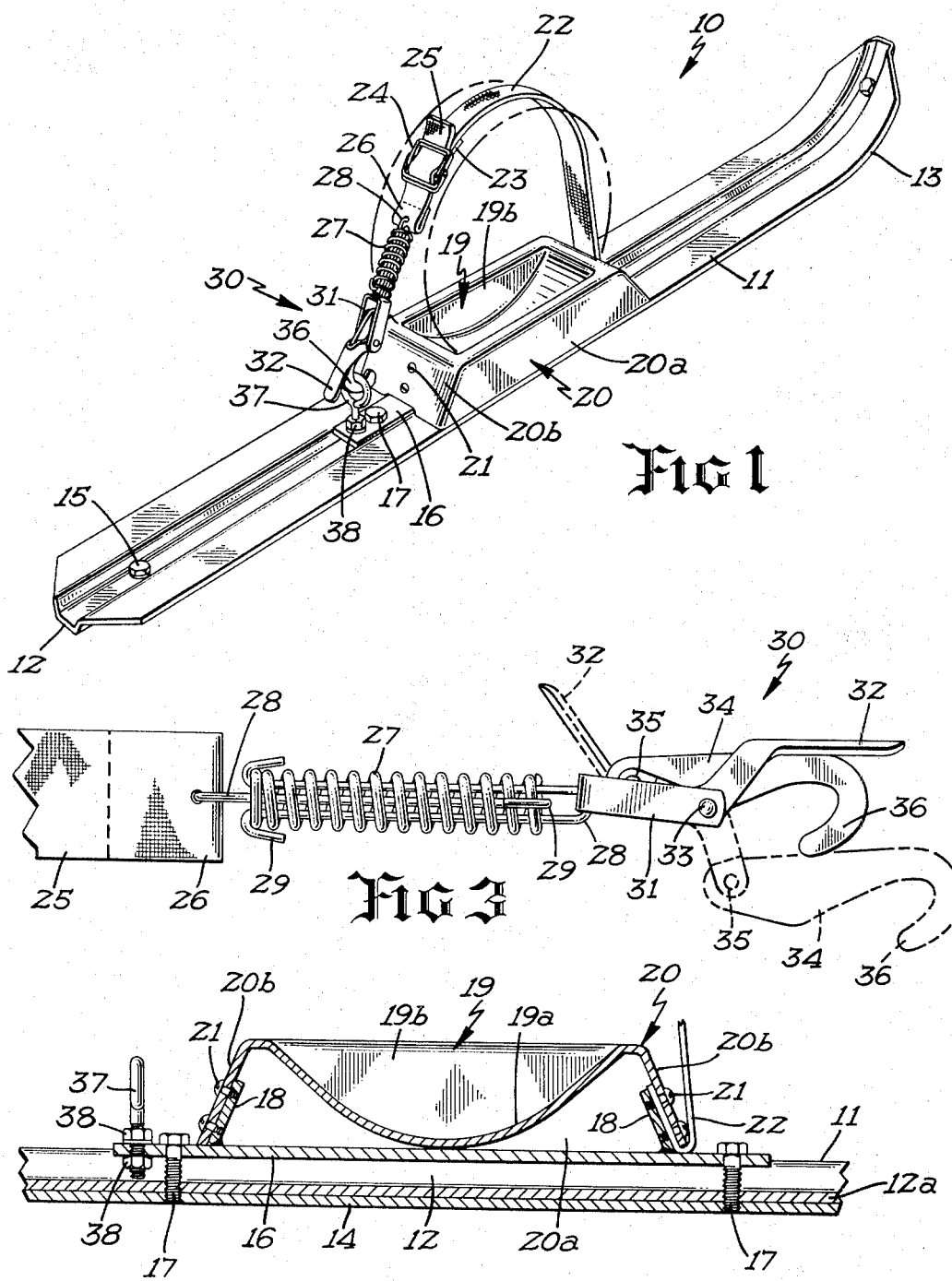
FIG. 1 is a perspective view of a novel device illustrated in mounted relation with respect to a vehicle wheel.
FIG. 2 is a fragmentary cross-sectional view of the device illustrating details of construction thereof.
FIG. 3 is a fragmentary elevational view of the toggle linkage lock mechanisms.

Referring now to the drawings and more specifically to FIG. 1, it will be seen that one embodiment of the novel ski device, designated generally by the reference numeral 10, is there shown. The ski device 10 includes an elongate ski 11 which is formed of a suitable rigid material such as metal, wood, plastic or the like. It will be noted that the ski is provided with a channel shaped central portion 12 and has a conventional upwardly curved front end portion 13. An elongate wear or keel plate 14 is secured to the web 12a of a channel-shaped central portion by suitable bolts 15, the latter extending through apertures in the web 12a and engaging in threaded apertures in the keep plate 14.

In the embodiment shown, the ski 11 is formed of metal and an elongate mounting plate 16 is secured to the upper surface of the ski by suitable bolts 17, which extend through the mounting plate and through openings in the web 12a of the central portion 12 of the ski and threadedly engage in threaded apertures in the keel plate. It will be noted that the mounting plate 16 is longitudinally oriented with respect to the ski and is positioned upon the upper surface of the ski adjacent the central portion thereof. The mounting plate 16 has a pair of upturned ears 18 integrally formed therewith and which converge in an upwardly direction as best seen in FIG. 2. These ears 18 are located adjacent but spaced from the ends of the mounting plate 16.

An elongate single piece wheel receiving well structure 19 is mounted on the upper surface of the ski 11 and this well structure is preferably formed of a suitable rigid plastic material. The wheel-receiving well structure 19 includes a longitudinally upwardly concave wheel engaging member 19a which is integrally formed with side members 19b, the latter members being vertically oriented. A downturned skirt 20 is integrally formed with the curved member 19a and the side members 19b, the skirt including vertical side walls 20a and end walls 20b. It will be noted that the end walls 20b diverge slightly in a downward direction and are positioned exteriorly of the upturned ears 18. The end walls 20b are also provided with suitable apertures, and bolts 21 extend through these apertures and threadedly engage in threaded apertures in the ears 18, thus securing the wheel-receiving well structure to the mounting plate 16, and to the ski. It will also be noted from FIG. 1 that the well structure 19 has a transverse or width dimension corresponding substantially to the width dimension of the ski.

Thus it will be seen that the wheel-receiving well structure 19 presents an upwardly concave recess which is sized and shaped to receive a conventional tire mounted wheel W therein. It will be noted that the longitudinally curved wheel engaging member 19a of the well structure is positioned against the upper surface of the mounting plate 16 so that the load is transmitted directly to the ski.

Means are provided for releasably securing the ski device to a wheel and to this end, an elongate flexible strap 22 is provided which is preferably made of a suitable fabric material. One end of the strap 22 extends between the front end wall 20b of the well structure and the associated ear 18 and is clamped therebetween. The bolts 21 also extend through openings in the clamped end portion of the strap 22. The other end portion of the strap 22 is looped as at 23 and a buckle 24 is secured to this looped end portion. A second strap or strap extension 25 is provided and one end portion is looped through the buckle 24 while the other end portion of the strap extension 25 is provided with a permanent looped end portion 26. The strap 22 and the strap extension 25 permit the overall length of the strap to be varied as desired.

Tension means are interconnected to the looped end portion 26 of the strap extension 25 and this tension means includes a helical spring 27. The helical spring is provided with a pair of similar elongate U-shaped attachment members 28 each extending through the spring 27 and each having out-turned ends 29. It will be noted that the bight end of one of the attachment members 28 extends through an opening in the looped end portion 26 of the strap extension 25 while the out-turned ends thereof extend outwardly and engage the opposite end of the helical spring 27. The other of the attachment members has its bight portion extending through an opening in the bight portion of a U-shaped link 31 of an over center toggle linkage lock 30 while the opposite ends of the last mentioned attachment member extend outwardly and engage the opposite end of the helical spring 27.

The toggle linkage lock means 30 includes the U-shaped link 31 which is pivotally connected to an elongate lever 32 intermediate the ends of the lever by pivots 33. In this regard, it is pointed out that the outer end of the arms of the U-shaped link 31 are pivotally connected to arms on the lever 32, the lever actually defining a crank as best seen in FIG. 3. One end of the locking link 34 is pivotally connected by a pivot 35 to one end of the lever 32 and the opposite end of the locking link is provided with a hook 36. The pivotal connection between the lever 32 and the U-shaped link 31 permits the end portion of the lever 32 to which the locking link 34 is pivoted to swing between the arms of the U-shaped link 31 between the over center locked position and a release position.

The hook 36 of the locking link 34 is engagable with a retaining element 37 which as shown is in the form of an eye bolt. The threaded shank of the eye bolt extends through an aperture in the mounting plate 16 and is secured in an adjusted position by suitable nuts 38.

In use, if a two wheel vehicle is to be equipped with the ski devices, each wheel, of course, will be positioned within the well structure 19 of a ski device. The vehicle may be elevated by a conventional jack and lowered so the wheel is positioned within the well structure of the ski device and the strap 22 and strap extension will be extended over the exterior surface of the wheel. The toggle linkage lock 30 will be in the unlocked condition so that the lever 32 will be swung in a counter-clockwise direction as viewed in FIG. 3 about its pivot 33. The hook 36 of the locking link 34 will be hooked into the retaining element 37 and the lever 32 will then be moved in a counter-clockwise direction to pivot the lever and locking link to the over-center locked position. The helical spring 37 will be under tension so that the toggle linkage lock will remain in its locked condntion until the lever 32 is pivoted to release the toggle linkage lock.

The vehicle is now equipped to travel over a snow covered surface. The size of the concavity defined by the upper surface of the well structure 19 will be dependant upon the size of the wheel to which the device 10 is applied. In most instances, the ski device will be applied to a tire mounted wheel. The ski device is adapted for use with various vehicles including driven vehicles as well as vehicles which are to be towed. In this regard, the ski device is especially adapted for use with two wheel vehicles which are adapted to be towed by snowmobiles. It is also pointed out that the ski device may be applied to the front wheel of a three wheeled all terrain vehicle.

From the foregoing description, it will be seen that I have provided a novel ski device which may be readily applied to and removed from the wheel of the vehicle to permit the vehicle to be readily equipped for travel over a snow covered surface.

The ski device is not only of simple and inexpensive construction, but it functions in a more efficient manner than any heretofore known comparable device.

What is claimed is:

1. A ski device for use with a wheeled vehicle, comprising
   an elongate ski,
   an elongate wheel-receiving well structure positioned on the upper surface of said ski adjacent the mid-portion thereof and being adapted to receive the wheel of a vehicle therein, said well structure being of single piece construction and including an elongate longitudinally extending upwardly concave wheel engaging member, a pair of side members integral with said wheel engaging member and extending upwardly therefrom, and a continuous skirt spaced from said wheel engaging member and said side member and integral therewith,
   a mounting plate releasably secured to the upper surface of said ski adjacent the mid portion thereof and extending longitudinally thereof, a pair of attachment elements on said mounting plate and projecting upwardly therefrom, means securing said attachment elements to the skirt of said well structure,
   an elongate strap having one end thereof connected with said ski adjacent one end of said well structure, and adapted to extend over the exterior surface of a vehicle wheel positioned in said well structure,
   a retaining element mounted on said ski adjacent the other end of said well structure,
   an over-center toggle linkage locking mechanism connected with said strap and releasably engaging said retaining element for releasably securing said strap on a vehicle wheel.

2. The ski device as defined in claim 1 wherein said one end of the strap is interposed between one of said attachment elements and said skirt of said well structure.

* * * * *